United States Patent [19]
Field et al.

[11] Patent Number: 5,804,314
[45] Date of Patent: Sep. 8, 1998

[54] SILICON MICROSTRUCTURES AND PROCESS FOR THEIR FABRICATION

[75] Inventors: Leslie A. Field; Phillip W. Barth, both of Portola Valley, Calif.

[73] Assignee: Hewlett-Packard Company, Palo Alto, Calif.

[21] Appl. No.: 216,206

[22] Filed: Mar. 22, 1994

[51] Int. Cl.$^6$ ........................................................ B32B 5/16
[52] U.S. Cl. ........................ 428/402; 156/647; 156/662; 216/2; 216/74; 216/75; 216/79; 216/94; 216/96; 216/99; 428/446
[58] Field of Search ................................... 156/644, 647, 156/662; 428/402, 446; 430/302, 313, 314, 316; 216/2, 74, 75, 79, 94, 96, 99

[56] References Cited

U.S. PATENT DOCUMENTS

| | | | |
|---|---|---|---|
| 5,316,979 | 5/1994 | MacDonald et al. | 437/203 |
| 5,338,400 | 8/1994 | Jerman | 156/647 |
| 5,364,742 | 11/1994 | Fan et al. | 430/317 |

FOREIGN PATENT DOCUMENTS

| | | | |
|---|---|---|---|
| 0413042A1 | 2/1991 | European Pat. Off. | G01N 27/00 |
| 0423497A1 | 4/1991 | European Pat. Off. | G02B 6/38 |
| 0468071A1 | 1/1992 | European Pat. Off. | G01B 7/34 |
| 0550973A1 | 7/1993 | European Pat. Off. | G02B 6/42 |
| 91/03716 | 3/1991 | WIPO | G01L 1/10 |

OTHER PUBLICATIONS

M. Alavi, S. Buttgenbach, A. Schumacher, H.J. Winger, "Laser Machining of Silicon for Fabrication of New Microstructures", IEEE, 1991, pp. 512–515.
Philip W. Barth, "Silicon Fusion Bonding for Fabrication of Sensors, Actuators and Microstructures", Sensors and Actuators, (1990) Elsevier Sequoia, pp. 191–926.
Richard C. Dorf, The Electrical Engineering Handbook, CRC Press, (1993), pp. 1159–1161.
Iwao Fujimasa, "Micromechanical Devices", Encyclopedia of Physical Science and Technology, (1990), Second Edition, vol. 10, Academic Press, Inc., Harcourt Brace Jovanovich, Publishers, pp. 139–155.
H. Sandmaier, H. L. Offereins, K. Kuhl, W. Lang, "Corner Compensation Techniques in Anisotropic Etching of (100)–Silicon Using Aqueous Koh", Conference Paper, Transducers '91, International Conference on Solid–State Sensors and Actuators, Jun. 24–27, 1991, pp. 456–459.

(List continued on next page.)

Primary Examiner—Hoa T. Le

[57] ABSTRACT

A flexible and efficient bulk micromachining method for fabricating a novel microstructure that is bounded by substantially planar surfaces meeting only at substantially right angle corner features. The novel microstructure of the present invention is useful as a spacer in assembly processes where high accuracy is required, such as precise positioning of optical fibers or conductors. In the preferred embodiment, the microstructure of the present invention includes a shelf feature disposed along a height dimension of the microstructure, which is required for some applications. The bulk micromachining method of the present invention includes providing a first substrate having a top planar surface and an opposing planar surface. The opposing surface of the substrate is anisotropically etched to provide a first thinned region. The top surface of the first substrate is anisotropically etched so that a first recessed feature having a vertical side is made integral with the first thinned region. Similarly, a second substrate having a top planar surface and an opposing planar surface is provided. The opposing surface of the second substrate is anisotropically etched to provide a second thinned region. The top surface of the second substrate is anisotropically etched so that a second recessed feature having a vertical side wall is made integral with the second thinned region. The top surface of the first substrate is aligned and coupled with the top surface of the second substrate to produce the desired microstructure. The substrates are cut or sawn to free the microstructure.

7 Claims, 10 Drawing Sheets

OTHER PUBLICATIONS

Kurt Petersen, Dale Gee, Farzad Pourahmadi, Russell Craddock, Joe Brown, Lee Christel, "Surface Micromachined Structures Fabricated with Silicon Fusion Bonding", IEEE, 1991, pp. 397–399.

Sorab K. Ghandi, "Theory and Practice of Microelectronics", Wiley & Sons, New York, 1968, pp. 3–9.

L. Tenerz, Y. Backlund, J. Tiren and J. O'Connell, "Perpendicular Walls Fabricated in <100>–Oriented Silicon by Anisotropic Wet Etching", Sensors and Materials, 1989, pp. 313–320.

Carlo H. Sequin, "Computer Simulation of Anisotropic Crystal Etching", IEEE, May, 1991, pp. 801–806.

Kurt E. Petersen, "Silicon as a Mechanical Material", Proc. IEEE, vol. 70, No. 5, May 1982, pp. 420–457.

A. Bruno Frazier and Mark G. Allen, "Metallic Microstructures Fabricated Using Photosensitive Polyimide Electroplating Molds", Journal of Microelectromechanical Systems, vol.2, No. 2, Jun. 1993, pp. 87–94.

Lee A. Christel and Kurt Petersen, "AMiniature Microwave Detector Using Advanced Micromachining", IEEE, 1992, pp. 144–147.

G. Albrecht, et al., "High–Repetition–Rate Diode–Pumped, Solid–State Slab Lasers", E&TR,Jun. 1992, pp. 7–14.

Wai–shing Choi and Jan G. Smits, "AMethod to Etch Undoped Silicon Cantilever Beams", Journal of Microelectromechanical Systems, vol. 2, No. 2, Jun. 1993, pp. 82–86.

C. H. Henry, G. E. Blonder and R. F. Kazarinov, "Glass Waveguides on Silicon for Hybrid Optical Packaging", Journal of Lightwave Technology, vol.7, No. 10, Oct. 1989, pp. 1530–1539.

G. Findler, J. Muchow, M. Koch and H. Munzei, "Temporal Evolution of Silicon Surface Roughness During Anisotropic Etching Processes", Micro Electro Mechanical Systems, '92, Travemunde (Germany), Feb. 4–7, 1992, pp. 62–66.

Eun Sok Kim, Richard S. Muller, and Raif S. Hijab, "Front––to–Back Alignment Using Resist–Patterned Etch Control and One Etching Step", Journal of Microelectromechanical Systems, vol.1, No. 2, Jun., 1992, pp. 95–99.

Klas Hjort, Jan–Ake Schweitz, Sven Anderson, Olof Kordina and Erik Janzen, "Epitaxial Regrowth in Surface Micromachining of GaAs", Micro Electro Mechanical Systems '92, Travemunde (Germany), Feb. 4–7, 1992, pp. 83–86.

SILICON MICROSTRUCTURES AND PROCESS FOR THEIR FABRICATION

BACKGROUND

The present invention is generally directed to micromachining and more specifically directed to bulk micromachining methods and high aspect ratio microstructures.

Micromachining is a set of processes that produces three-dimensional microstructures using sequences of photolithographic pattern transfer, etching and deposition in a batch processing method. Aspect ratio of a microstructure is expressed as a height dimension of the microstructure divided by a width dimension of the microstructure. High aspect ratio microstructures each having a respective height dimension substantially longer than a respective width dimension are needed for many applications such as fixturing and jigging at microscopic scales. For many of these applications, it is important that the microstructures are bound by planar surfaces that meet only at right angle features. Such microstructures are useful as spacers in assembly processes where high accuracy is required. Examples of such assembly processes are precise positioning of optical fibers or conductors. Once the spacing is imposed by such microstructures, adhesives such as epoxies or the like can be employed for permanently fixturing the assembled components. Such applications require high aspect ratio microstructures having a height dimension in a range from a few microns to hundreds of microns and having a width dimension in a range from a few microns to thousands of microns. It is preferred that such microstructures have a depth dimension in a range from a few tens of microns to thousands of microns. For some of these applications, it is required that the high aspect ratio microstructures include a shelf feature disposed along the height dimension of the microstructure.

Micromachining methods are generally classified into two categories: bulk micromachining and surface micromachining. Bulk micromachining methods focus on sculpting a suitable bulk substrate, such as silicon, using chemical etchants. In contrast, surface micromachining methods focus on etching films deposited upon a substrate.

In general, using conventional silicon processes, a thickness of a deposition layer cannot reach more than approximately 10 microns. Accordingly, surface micromachined devices are essentially two dimensional in structure, having only limited third dimensional features. A previously known LIGA process extends the range of batch-fabricated structures to truly three-dimensional structures. The acronym LIGA stands for the German words LIthographie, Galvanoformung, Abformung. Translated, these words are lithography, electro-forming, and molding.

The LIGA process relies on a type of lithography that utilizes a thick resist mask and X rays produced by a synchrotron. The X rays are exposed through a high atomic number material as a negative mask onto portions of the thick resist mask, which comprises cross-linked polymethacrylate. The resist is then developed to remove the portions of the thick resist mask exposed to X-rays. Enhanced aspect ratio microstructures are then produced by plating nickel or other metals where the portions of resist have been removed. More specifically, the resulting enhanced aspect ratio microstructures can have lateral faces of two to three microns, but have heights of more than 100 microns. The LIGA process, as well as other micromachining processes are discussed in an article "Micromechanical Devices" by Iwao Fujimasa, in "Encyclopedia of Physical Science and Technology, volume 10, pp.139–155, Academic Press (1992). Because this article provides helpful background information, it is hereby incorporated by reference. While the LIGA process provides some advantages, the required synchrotron is expensive and is not widely available. Furthermore, metal microstructures are undesirable for some applications. Accordingly, other micromachining methods are needed for fabricating high aspect ratio microstructures.

Bulk micromachining methods provide sculpting of suitable bulk substrates, such as silicon, using chemical etchants. In accordance with photolithography principles, a patterned mask is constructed that covers some portions of a silicon surface while leaving other portions exposed to etchants. Since the 1950's the processes of chemical etching of silicon have been developed with isotropic etchants such as HF, $HNO_3$ and $CH_3COOH$. Initially reported in 1954, orientation dependent anisotropic etching employs potassium hydroxide (KOH) or other alkaline solutions to etch different planes of silicon crystals at different rates.

In particular, anisotropic etching of silicon having a particular crystal lattice orientation, commonly known as (100) silicon, has played a key role in previously known micromachining schemes. Yet such previously known schemes often could not meet the demand for complex geometry microstructures because convex corners features of such microstructures, i.e. corners turning outside, are laterally undercut. As a result of such lateral undercutting, such microstructures are bound by some surfaces that are not truly planar. These problems can be reduced by so-called corner compensation structures, which are added to corners of the mask layout. Depending on a selected etching solution, different corner compensation structures are used. "Corner Compensation Techniques in Anisotropic Etching of (100)- Silicon Using Aqueous KOH" by H. Sandmaier et al., Proceedings of the International Conference on Solid-State Sensors and Actuators, Jun. 14–15 1991, pp 456–459, provides helpful background information. It is incorporated herein by reference. While such corner compensation techniques provide some advantages, they complicate mask layout procedures. Furthermore, undercutting of the corner compensation structures limits the aspect ratio of microstructures having the convex right angle features.

What is needed is a flexible and efficient bulk micromachining method for fabricating high aspect ratio microstructures that are bounded by planar surfaces meeting only at right angle corner features. Further requirements are that the resulting microstructures have a height dimension in a range from a few microns to hundreds of microns, have a width dimension in a range from a few microns to thousands of microns. It is preferred that the microstructures have a depth dimension in a range from a few tens of microns to thousands of microns. For some applications, it is also required that the high aspect ratio microstructures include a shelf feature disposed along the height dimension of the microstructure.

SUMMARY OF THE INVENTION

The present invention provides a flexible and efficient bulk micromachining method for fabricating a novel microstructure that is bounded by planar surfaces meeting only at right angle corner features. The novel microstructure of the present invention has a height dimension in a range from a few microns to hundreds of microns and has a width dimension in a range from a few microns to thousands of microns. A preferred embodiment of the novel microstructure has a high aspect ratio so that the height dimension of the microstructure is substantially larger than the width dimension of the microstructure. Preferably, the microstructure has a depth dimension in a range from a few tens of microns to thousands of microns. The novel microstructure of the present invention is useful as a spacer in assembly processes where high accuracy is required, such as precise positioning of optical fibers or conductors. In the preferred embodiment, the microstructure of the present invention includes a shelf feature disposed along the height dimension of the microstructure, which is required for some applications.

Briefly and in general terms, the bulk micromachining method of the present invention includes providing a first substrate having a top planar surface and an opposing planar surface. The opposing surface of the substrate is masked and is anisotropically etched to provide a first thinned region. The top surface of the first substrate is masked with a mask layer and is anisotropically etched so that a first recessed feature having a vertical side is made integral with the first thinned region.

Similarly, a second substrate having a top planar surface and an opposing planar surface is provided. The opposing surface of the second substrate is masked and is anisotropically etched to provide a second thinned region. The top surface of the second substrate is masked with another mask layer and anisotropically etched so that a second recessed feature having a vertical side wall is made integral with the second thinned region. The top surface of the first substrate is aligned and coupled with the top surface of the second substrate to produce the desired microstructure. Another advantage of coupling the substrates is that the height dimension of the microstructure is extended to provide for the desired high aspect ratio. The substrates are cut or sawn to free the microstructure.

The substantially planar surfaces and the substantially right angle corner features of the microstructures of the present invention are achieved by taking advantage of the uniform crystal lattice structure of substrate materials such as silicon. Preferably, the first and second substrate each have a respective crystalline structure characterized by a respective set of <100> crystal lattice directions. The planar surfaces of each substrate are orthogonal to a respective member of the respective set of <100> crystal lattice directions. Furthermore, the mask layers each have mask edges oriented along another respective member of the respective set of <100> crystal lattice directions. The respective side wall of each of the recessed features undercuts the respective mask edge and is orthogonal to the respective substrate surface. The substrates are preferably sawn along yet another respective member of the respective set of <100> crystal lattice directions to yield the desired high aspect ratio microstructures bound by planar surfaces meeting only at right angle corner features. Alternatively, the substrates are cut, for example, by laser scribing techniques.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENT

Figure 1A:
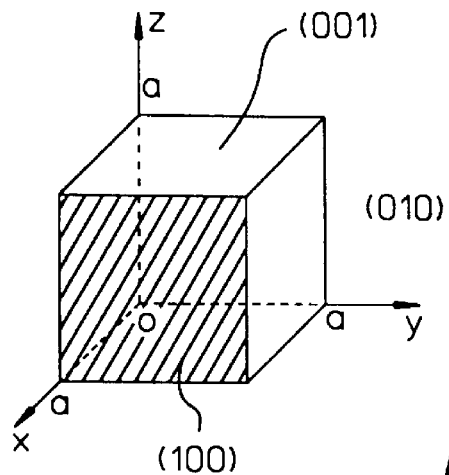
FIGS. 1A through C are each simplified isometric views of a silicon crystal lattice cube.

As shown in the drawings for the purposes of illustration, the present invention provides a flexible and efficient bulk micromachining method for fabricating a novel high aspect ratio microstructure that is bound by substantially planar surfaces meeting only at substantially right angle corner features. The microstructures of the present invention are achieved by taking advantage of a uniform crystal lattice structure of materials such as silicon.

Terminology for crystal planes and crystal lattice directions discussed herein follows "The Theory and Practice of Microelectronics" by Sorab K. Ghandhi, Wiley and Sons, New York, 1968, pp 3–9, which is incorporated herein by reference. As discussed in greater detail later herein, this widely accepted terminology employs three arguments surrounded by square brackets, [x x x], angled brackets, <x x x>, parentheses, (x x x), or braces, {x x x}.

Figure 1B:
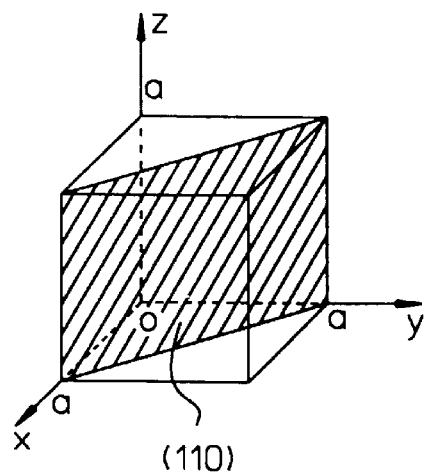
Figure 1C:
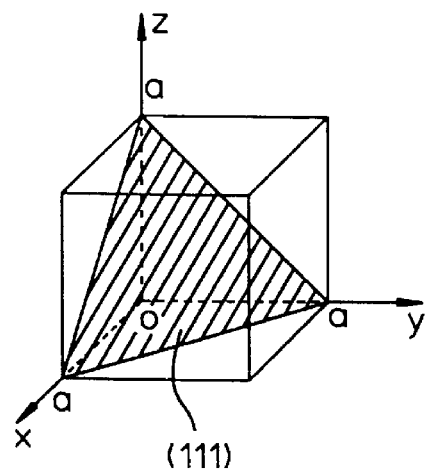

Within the uniform crystal lattice structure, there exists a high degree of symmetry. Such symmetry is illustrated by FIGS. 1A through C, which are each simplified isometric views of a silicon crystal lattice cube having edge length, a. For the purposes of illustration, three mutually orthogonal cartesian axes are shown in each of FIGS. 1A through C. A lowest order set of crystal lattice directions having members directed along the three mutually orthogonal axes includes a first member [100] directed along a cartesian x-axis, a second member [010] directed along a cartesian y-axis, and a third member [001] directed along a cartesian z-axis.

Because of symmetry considerations, this lowest order set of crystal lattice directions is designated as a set of <100> crystal lattice directions. Similarly, a flat crystal plane is described by a vector orthogonal to a surface of a plane. A set of all planes orthogonal to the first member [100]

directed along the cartesian x-axis is designated as a set of (100) planes, representatively illustrated by a shaded plane labeled (100) in FIG. 1A. A set of all planes orthogonal to the second member [010] directed along the cartesian Y-axis is designated as a set of (010) planes, representatively illustrated by a plane labeled (010) in FIG. 1A. A set of all planes orthogonal to the third member [001] directed along the cartesian Z-axis is designated as a set of (001) planes, representatively illustrated by a plane labeled (001) in FIG. 1A. By extension of the symmetry considerations, a set of all planes orthogonal to any member of the set of <100> crystal lattice directions is designated as a set of {100} planes.

There exist other crystal lattice directions such as an additional [110] lattice direction oriented at a forty five degree angle to the [100] lattice direction. A set of all planes orthogonal to the additional [100] lattice directions is designated as a set of (110) planes, representatively illustrated by a shaded plane labeled (110) in FIG. 1B. By extension of the symmetry considerations, there exist other sets of crystal lattice directions such as a set of <110> lattice directions, each oriented at a forty five degree angle to a respective nearest member of the set of <100> lattice directions. Associated with the set of <110> lattice directions is a set of {110} planes Yet another lattice direction is designated as a [111] lattice direction. The [111] lattice direction is oriented approximately 54.73 degrees from the [100] lattice direction. A set of all planes orthogonal to the [111] lattice directions is designated as a set of (111) planes, representatively illustrated by a shaded plane labeled (111) in FIG. 1C. There also exist a set of <111> directions, each oriented at approximately 54.73 degrees from a respective nearest member of the set of <100> lattice directions. Associated with the set of <111> lattice directions is a set of {111} planes. Many other higher order sets of planes exist having similar designations. For example, each member of a set of <310> directions is oriented 18.43 degrees from a respective nearest <100> direction.

It is preferred that a first and second silicon wafer substrate are used in the invention. Each substrate has a respective top planar surface and a respective opposing planar surface. The planar surfaces of each substrate are orthogonal to a member of the set of <100> crystal lattice directions of each substrate. Such wafers are commonly referred to as <100> silicon wafers. It should be understood that while it is preferred that the first and second substrate are <100> silicon wafer substrates, those with ordinary skill in the art will appreciate that the principles of the invention discussed herein are likewise applicable to other materials having uniform crystal lattice structures, for example gallium arsenide, and to substrates having surfaces orthogonal to other sets of crystal lattice directions, such as those discussed previously herein.

FIGS. 2A through 2J are simplified, cut away, cross sectional views of substrates, which illustrate masking and etching steps of a preferred embodiment of the micromachining method of the present invention. In the preferred embodiment, a wafer polishing machine is used to polish the planar surfaces of each of the substrates. Low Pressure Chemical Vapor Deposition (LPCVD) or a suitable alternative means is used for simultaneously depositing a respective silicon nitride mask layer upon each of the planar surfaces of the substrates. Low stress silicon nitride mask layers each approximately 120 nanometers thick are preferred. However, other low stress nitride layer thickness and other layer thicknesses of other materials that resist anisotropic etchants may be alternatively employed with beneficial results. For example, alternative materials such as silicon dioxide or stoichiometric nitride may be used since these materials resist anisotropic etchants.

Figure 2A:
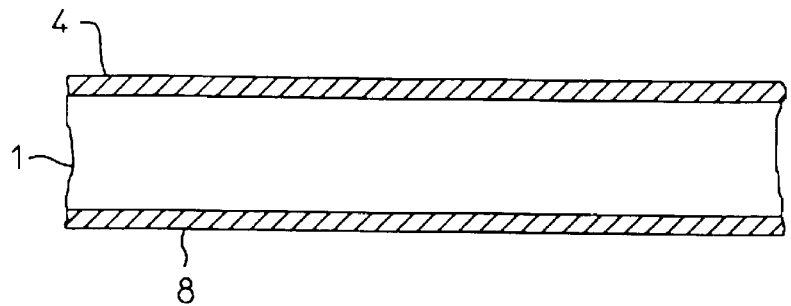
FIGS. 2A through J are simplified, cut away, cross sectional views of substrates, which illustrate masking and etching steps of the preferred embodiment of the micromachining method of the present invention.
Figure 2B:
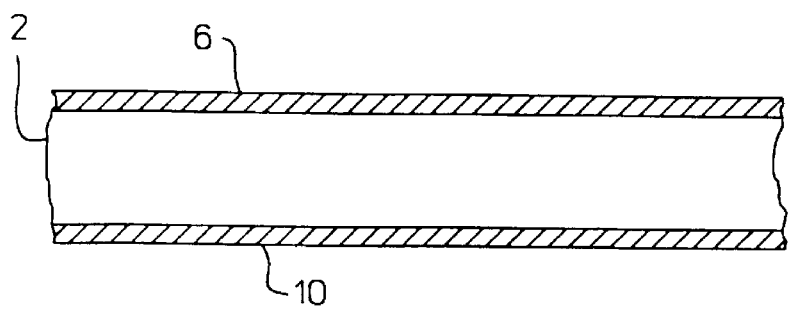
Figure 2C:
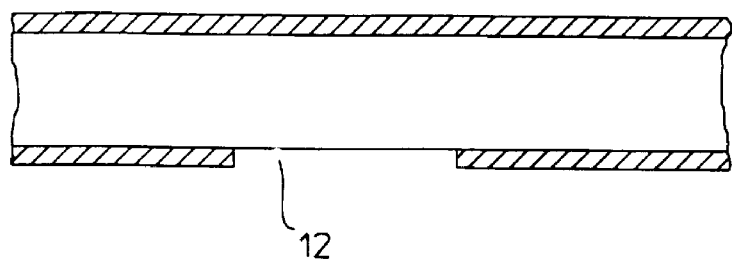

FIGS. 2A and 2B are simplified detailed cross sectional views of the first substrate 1 and the second substrate 2, respectively. As shown in FIG. 2A, a first silicon nitride mask layer 4 is disposed on the top surface of the first substrate 1. A second silicon nitride mask layer 8 is deposited on the opposing surface of the first substrate as shown in FIG. 2A. Similarly, a third silicon nitride mask layer 6 is disposed on the top surface of the second substrate 2 as shown in FIG. 2B. Additionally, a fourth silicon nitride mask layer 10 is disposed on the opposing surface of the second substrate as shown in FIG. 2B.

Using well known photolithography processes, photoresist (not shown in the figures) is spun onto the nitride mask layers that are deposited on the planar surfaces of the substrates. Selected portions of the photoresist layers deposited on both top and opposing surfaces of each substrate are exposed to light using photolithographic masks in a double sided mask aligner. For the first substrate, it is preferred that the photoresist disposed on the first and second nitride layers be exposed simultaneously so as to provide advantageous alignment of resulting features discussed in greater detail later herein. By similar reasoning it is also preferred that for the second substrate, the photoresist disposed on the third and fourth nitride layers be exposed simultaneously. The exposed photoresist layers are then developed to produce pattern features extending through the photoresist and exposing portions of the underlying silicon nitride layers. An oxygen, $O_2$, plasma is used to "de-scum" the photoresist layers so as to remove debris from the exposed portions of the underlying silicon nitride layers.

Figure 2D:
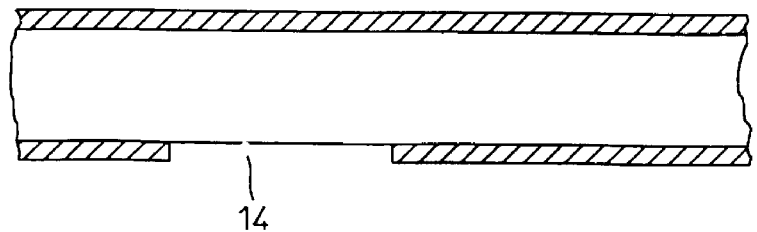

A plasma of carbon tetrafluoride, $CF_4$, and oxygen, $O_2$, or other suitable gases is used to etch the exposed portions of the underlying silicon nitride layers. For the respective silicon nitride layers disposed on the opposing surface of each substrate, etching produces pattern features having desired width dimensions and extending through the silicon nitride layers. As shown in cross section in FIG. 2C, a pattern feature 12 selectively exposes the opposing side of the first substrate. Similarly, another pattern feature selectively exposes the opposing side of the second substrate, as shown in FIG. 2D.

Figure 2E:
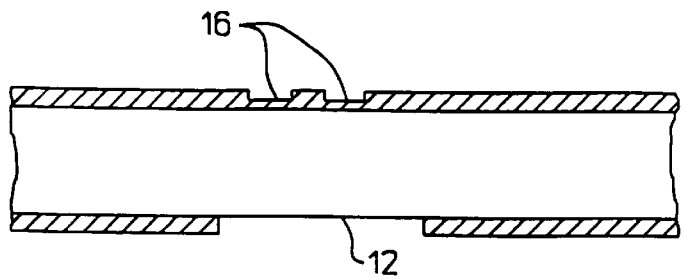
Figure 2F:
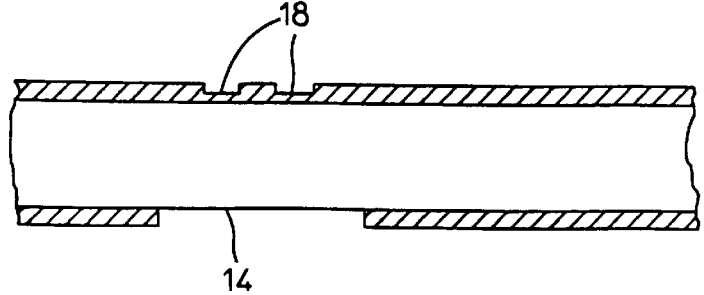

For the respective silicon nitride layers disposed on the top surface of each substrate, it is preferred that etching parameters, for example etching time, are controlled so as to produce pattern features extending approximately half way through the silicon nitride layers. As shown in FIG. 2E, pattern features 16 extend approximately half way through the silicon nitride layer deposited on the top surface of the first substrate. It should be noted that the pattern features 16 extending into the silicon nitride layer disposed on the top surface of the first substrate are advantageously aligned with the pattern features 12 extending through the silicon nitride layer disposed on the opposing surface of the first substrate. As shown in FIG. 2F, additional pattern features 18 extend approximately half way through the silicon nitride layer deposited on the top surface of the second substrate. Once again, it should be noted that the pattern features 18 extending into the silicon nitride layer disposed on the top surface of the second substrate are advantageously aligned with the pattern features 14 extending through the silicon nitride layer disposed on the opposing surface of the second substrate.

A preferred anisotropic etchant is used to etch the first and second substrate. It should be understood that in general anisotropic etchants provide etching in various directions at different rates. For example, the preferred anisotropic etchant employed in the micromachining method of the present invention etches silicon in the <111> crystal lattice directions more slowly than in any other lattice direction. Furthermore, the preferred anisotropic etchant etches silicon in the <100> directions more slowly than in the <110> directions and many of the other higher order crystal lattice directions.

The preferred anisotropic etchant employed by the invention is an aqueous solution of potassium hydroxide, KOH. Another anisotropic etchant such as an aqueous solution of ethylenediamine and pyrocatechol, EDP, may be alternatively employed with beneficial results. The preferred anisotropic etchant has a temperature of 100 degrees celsius and has a 30% KOH concentration by weight. At this temperature and concentration, an etch rate of silicon in each of the <100> lattice directions is approximately 3 microns per minute. If a different etch rate is desired, the etch rate can be varied by varying the temperature and KOH concentration of the solution.

The preferred anisotropic etchant is used to etch vertically into exposed portions of the respective opposing surface of each substrate so as to produce respective thinned regions. Etching is timed to produce a respective desired amount of the vertical etching into each of the substrates. Vertical etching of each of the silicon substrates takes place at exposed {100} planes that are parallel to the respective opposing surfaces of the substrates.

Figure 2G:
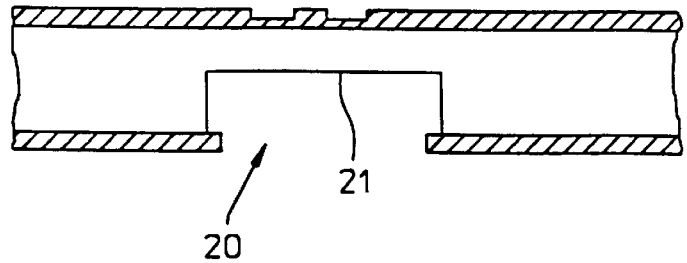

Therefore, in accordance with the micromachining method of the present invention, the preferred anisotropic etchant is used to etch vertically into a first exposed portion of the opposing surface of the first substrate so as to produce a first thinned region 20, as shown in FIG. 2G. Etching is timed to produce a first amount of the vertical etching into the first substrate. The first thinned region has a first floor 21 comprising a member of the set of {100} crystal planes of the first substrate. The first floor is parallel to the opposing surface of the first substrate.

Figure 2H:
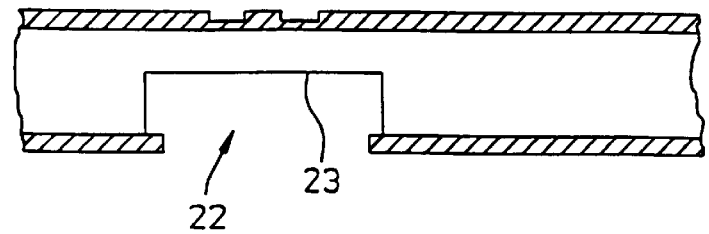

Similarly, as shown in FIG. 2H, the preferred anisotropic etchant is used to etch vertically into a second exposed portion of the opposing surface of the second substrate so as to produce a second thinned region 22. Etching is timed to produce a second amount of the vertical etching into the second substrate. The second thinned region has a second floor 23 comprising a member of the set of {100} crystal planes of the second substrate. The second floor is parallel to the opposing surface of the second substrate.

Lateral etching of each of the silicon substrates takes place at {100} planes that are orthogonal to the respective opposing surfaces. The lateral etching produces undercutting of each of the mask layers deposited on the opposing substrate surfaces as shown in FIGS. 2G and 2H. An amount of the lateral etching is approximately equal to an amount of the vertical etching discussed previously herein.

Figure 2I:
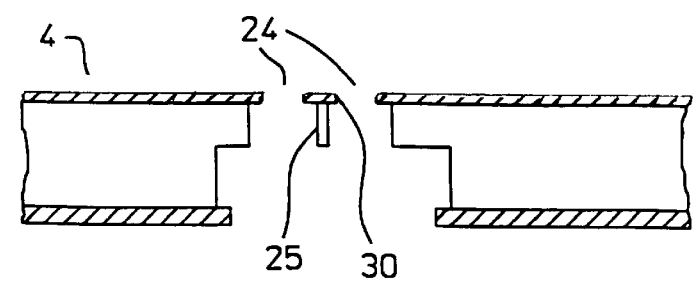
Figure 2J:
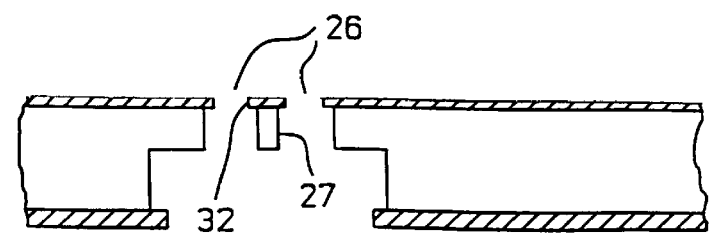

As shown FIGS. 2I and 2J, additional plasma etching is used to extend the respective pattern features entirely through each of the nitride mask layers that are deposited on the respective top surfaces. Each of the nitride mask layers that are deposited on the respective top surfaces has a respective mask edge 30, 32 along side the pattern features. As discussed previously herein, the planar surfaces of each substrate are orthogonal to a member of the set of <100> crystal lattice directions of each substrate. The method of the invention further includes orienting a respective longitudinal dimension of each mask edge along another respective member of the set of <100> crystal lattice directions of each substrate. For <100> silicon wafer substrates, this is achieved by orienting the respective longitudinal dimension of each mask edge at a forty five degree angle to a respective wafer flat. Alternative crystallographic orientation and fiduciary marking schemes may be employed with beneficial results.

Just as with the thinned regions discussed previously, the preferred anisotropic etchant is used to etch respective recessed features 24, 26 extending vertically into the respective top surface of each silicon substrate, as shown in FIGS. 2I and 2J. Vertical etching of each of the silicon substrates takes place at exposed {100} planes that are parallel to the respective top surfaces. Etching is once again timed, producing a respective desired amount of the vertical etching into each of the top surfaces. As shown, each of the recessed features 24, 26 is vertically adjacent to a respective one of the thinned regions.

A first one of the recessed features 24 includes a first sidewall 25 comprising a member of the set of {100} crystal planes of the first substrate. Similarly, a second one of the recessed feature 26 includes a second sidewall 27 comprising a member of the set of {100} crystal planes of the second substrate. As shown in FIG. 2E, the first sidewall 25 is orthogonal to the top surface of the first substrate. Similarly, the second sidewall 27 is orthogonal to the top surface of the second substrate.

Lateral etching produces undercutting of each of the mask layers as shown in FIGS. 2I and 2J. For example, as shown, the first mask edge 30 is undercut by the first recessed feature. As shown, the first recessed feature 24 is adjacent to the first mask edge 30. Similarly, the second mask layer 6 has a second mask edge 32 that is undercut by the second recessed feature. As shown, the second recessed feature 26 is adjacent to the second mask edge 32.

Figure 3:
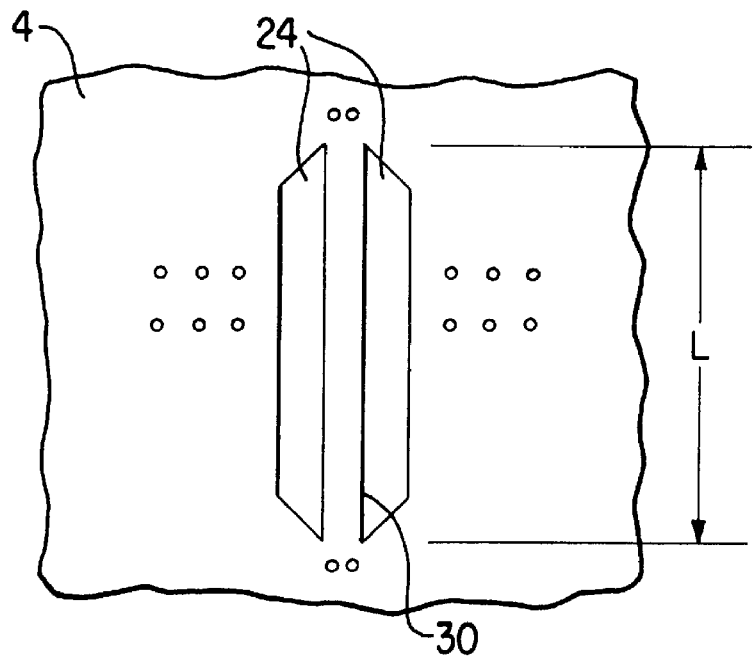
FIG. 3 is a detailed cut away plan view of a first mask layer of the preferred embodiment.

As indicated previously herein, the first and second mask edge each have a respective longitudinal dimension. FIG. 3 is a detailed plan view of the first mask layer 4, which provides an exemplary illustration showing the longitudinal dimension, L, of the first mask edge 30. FIG. 3 further shows saw guide markings of the first mask layer disposed along side the longitudinal dimensions of the mask edges. The first recessed feature 24 is adjacent to the first mask edge 30, as shown in FIG. 3 and discussed previously with respect to FIG. 2I. Additional reference markings in the first mask layer are helpful in ascertaining etch completion. FIG. 3 also shows the additional reference markings disposed near opposing extremities of the first recessed feature.

Preferably, the first and second substrate are prepared for coupling by removing the silicon nitride mask layers in a suitable bath of hydrofluoric acid. The substrates are cleansed using sulfuric acid, hydrogen peroxide, and reverse RCA cleaning processes well known to those skilled in the art. The substrates are then coupled so as to provide an aligned mating of the respective top surfaces of each substrate.

Figure 4:
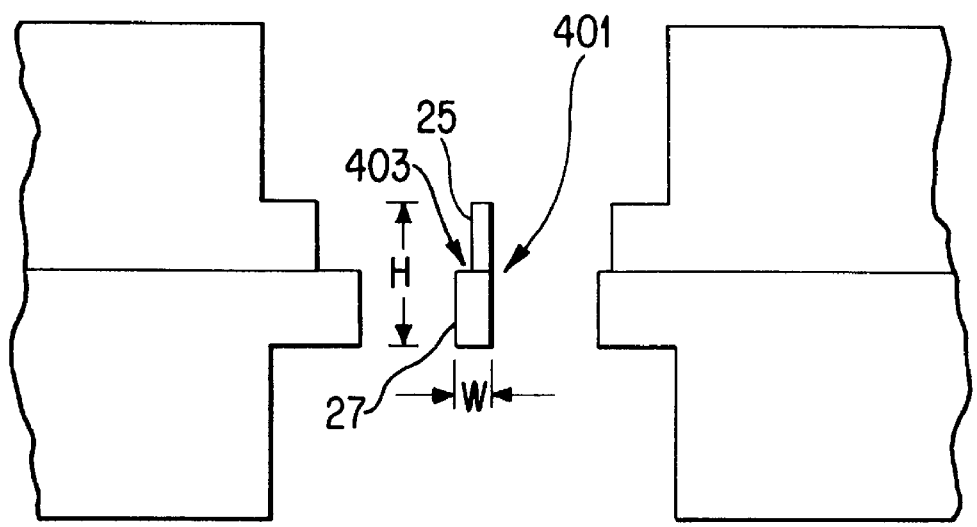
FIG. 4 is a cut away cross sectional view of an aligned mating of the respective top surfaces of each substrate, which shows recessed features of the preferred embodiment in detail.

FIG. 4 is a detailed cut away cross sectional view of the aligned mating of the respective top surfaces of each substrate, which shows the recessed features in detail. As shown, the first substrate is aligned with the second substrate so that the first recessed feature is adjacent to the second recessed feature. As discussed in greater detail later herein, a preferred mechanical alignment process is used to provide for the aligned mating of the respective top surfaces of each substrate. The top surface of the first substrate is coupled to the top surface of the second substrate, preferably by a fusion bonding process, to produce a preferred high aspect ratio microstructure 401. The fusion bonding process comprises heating the aligned substrates at approximately 1,000 degrees centigrade for approximately one hour. As shown, the microstructure has a desired height dimension, H, which is in a range from a few microns to hundreds of microns. By coupling the surface of the first substrate to the surface of the second substrate, the height dimension of the microstructure is advantageously extended to provide for the high aspect ratio. The desired height dimension, H, of the microstructure is selected by controlling the amount of vertical etching used to produce the first thinned region 20 and by controlling the amount of vertical etching used to produce the second thinned region 22. These amounts of vertical etching are discussed previously herein with respect to FIGS. 2G and 2H.

As shown in FIG. 4, the preferred embodiment of the microstructure of the present invention advantageously includes a shelf feature 403 disposed along the height dimension of the microstructure. As shown, the side wall 25 of the first recessed feature is suitably offset from the side wall 27 of the second recessed feature to produce the shelf feature 403. The shelf feature has a width dimension selected by suitably controlling the masking and etching discussed previously herein. Similarly, the microstructure has a desired width dimension, W, which is in a range from a few microns to thousands of microns and which is selected by controlling the masking and etching discussed previously herein.

Figure 5:
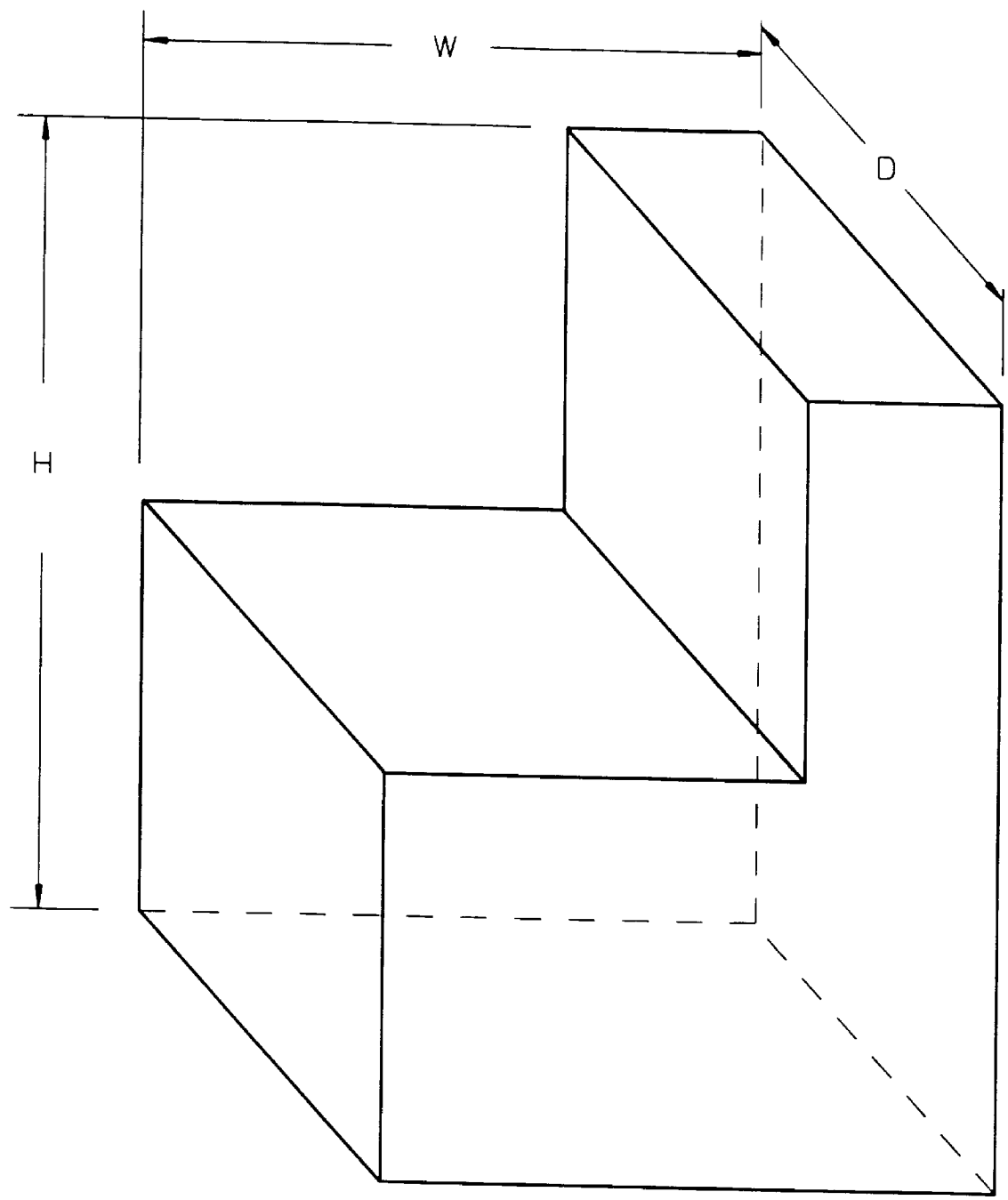
FIG. 5 is an isometric view of a preferred embodiment of the microstructure of the present invention.

In the preferred embodiment, the microstructure has a depth dimension, D, (not shown in FIG. 4) oriented along yet another one of the <100> lattice directions. The microstructure is cut with a laser or is sawn so that the depth dimension of the microstructure is in a range from a few tens of microns to thousands of microns. FIG. 5 is an isometric view of a preferred embodiment of the microstructure of the present invention, which shows the depth dimension, D, of the microstructure and additionally shows the height dimension, H, and width dimension, W, discussed previously with respect to FIG. 4. The microstructure is cut or sawn so that the microstructure is entirely bounded by planar surfaces meeting only at right angle corner features.

It is generally preferred that the microstructure is sawn by using a dicing machine having a kerf width for sawing through the bonded silicon wafer substrates. The bonded silicon wafer substrates are loaded onto a carrier and sawn entirely through using a dicing machine having a blade oriented at another forty five degree angle to the flats of the bonded wafers. However, it should be briefly noted that if the desired depth dimension of the microstructure is less than the kerf width of the saw, then it is preferred that the microstructure is cut by using a laser scribing machine instead of sawn by using the dicing machine.

Figure 6A:
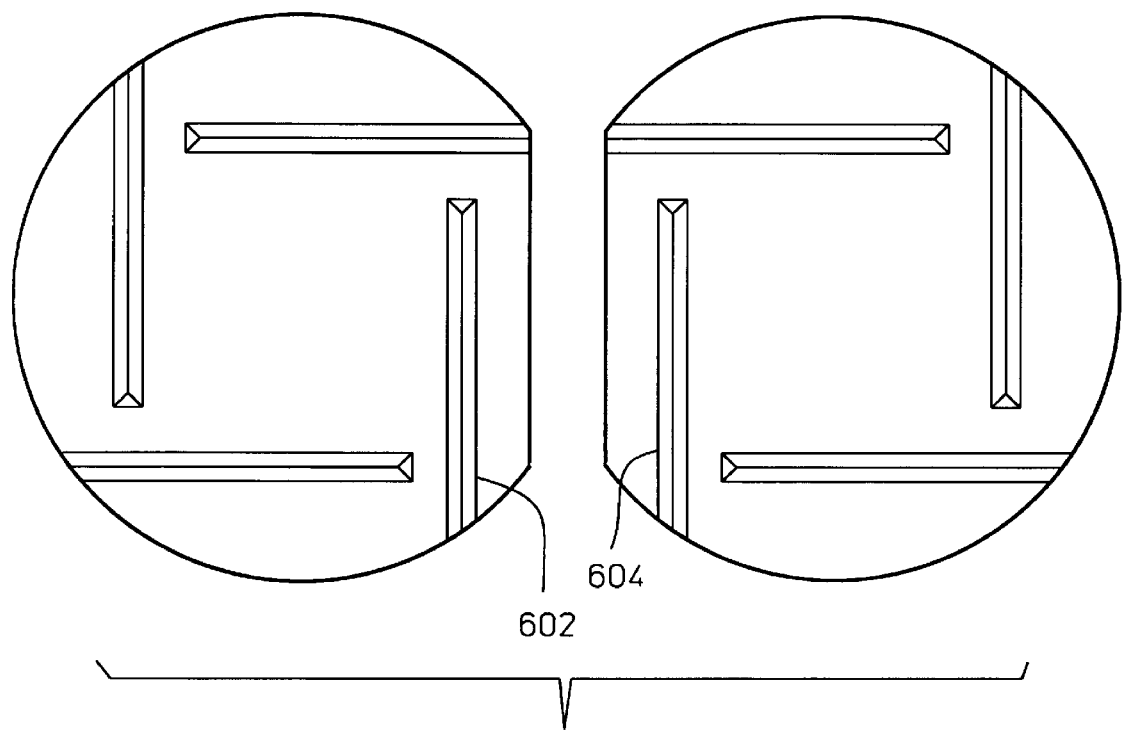
FIG. 6A is a simplified plan view showing the top surfaces of the preferred first and second substrates.

The preferred mechanical alignment process employs cylindrical pyrex glass fibers placed in fiber align grooves, which are photolithographically etched into peripheral regions of the respective top surface of each of the silicon wafer substrates. FIG. 6A is a simplified plan view showing the top surfaces of the first and second silicon wafer substrates, and showing a respective four of the fiber align grooves etched into peripheral regions of the respective top surface of each of the silicon wafer substrates. As shown, the respective fiber align grooves of each substrate are arranged in symmetric patterns to provide for the aligned mating of the respective top surfaces of each substrate. For example, a first fiber align groove 602 of the first substrate and a first fiber align groove 604 of the second substrate are each symmetrically arranged on the respective substrates to provide for the aligned mating of the respective top surfaces of each substrate. For the sake of simplicity, the first and second recessed features, which are centrally disposed on the silicon wafer substrates, are not shown in FIG. 6A. It should be understood that many microstructures are simultaneously constructed using the principles discussed previously herein in conjunction with multiple sets of first and second recessed features centrally disposed on the silicon wafer substrates.

Figure 6B:
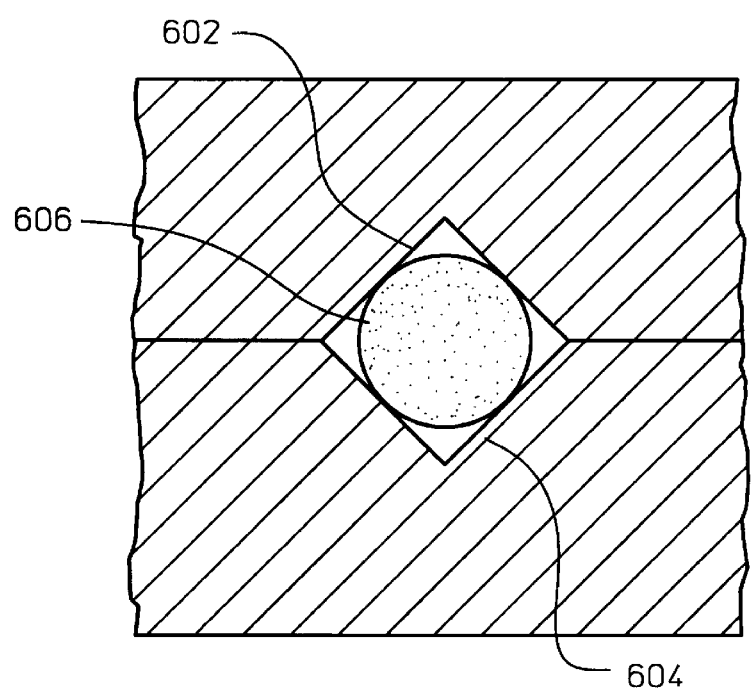
FIG. 6B is another cut away detailed cross sectional view of the aligned mating of the respective top surfaces of each substrate, which shows fiber align grooves in detail.

FIG. 6B is another cut away cross sectional view of the aligned mating of the respective top surfaces of each substrate, which shows the first and second fiber align grooves 602, 640 in detail. As shown, a first cylindrical glass fiber 606 is disposed in the first fiber align groove 602 of the first substrate and disposed in the first fiber align groove 604 of the second substrate. Preferably, the glass fiber is a pyrex glass optical fiber having a well-controlled diameter of 125 microns. As shown, each of the fiber align grooves has a "v" shaped cross section. The fiber align grooves are made by first photolithographically defining and then etching suitable channels into the silicon nitride mask layers discussed previously herein. The fiber align grooves are produced by etching the silicon wafer substrates using a suitable etchant. Preferably, the etch is timed so that the grooves etched into the substrates have a depth of approximately 107.5 microns and have a width of approximately 153 microns. Preferably, the fiber align grooves are created simultaneously with the thinned regions discussed previously herein, and before creation of the first and second recessed features.

Each fiber is initially placed into a respective fiber align groove of the second substrate. The respective top surfaces of each substrate are then aligned so that each fiber also engages a respective one of the fiber align grooves of the first substrate. The substrates are then fusion bonded as discussed previously.

The silicon substrates each have a first coefficient of thermal expansion and the pyrex glass fiber each have a second coefficient of thermal expansion. Since the coefficient of thermal expansion of the pyrex glass fibers is less than the coefficient of thermal expansion of the silicon, the fibers can remain in the grooves during the fusion bonding process without substantial adverse effects.

An alternative embodiment of the method of the invention is generally similar to the preferred embodiment discussed previously, with reference to FIGS. 2A–E, 3 and 4. However in the alternative embodiment, the second recessed feature of the second substrate does not extend entirely through the second substrate and the substrates are aligned with one another using a double sided mask aligner instead of using the fiber align grooves. For example, as illustrated in cut away cross section view in FIG. 7, the second recessed feature 726, extends part way through the second substrate so as to leave a very thin layer of silicon 750 approximately five to thirty microns thick.

Figure 7:
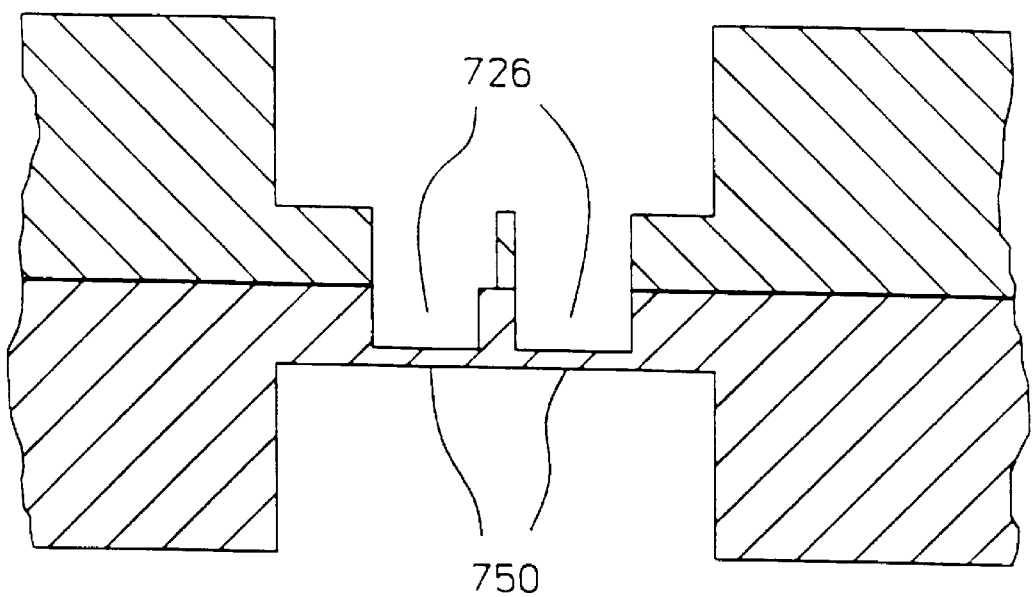
FIG. 7 is a cut away cross sectional view of an aligned mating of the respective top surfaces of each substrate, which shows recessed features of an alternative embodiment in detail.

The layer of silicon is thin compared to dimensions of the microstructure, but is sufficiently thick so that standard vacuum transfer wafer handling equipment can be used in conjunction with the double sided mask aligner. The thin layer of silicon allows a vacuum chuck of the double sided mask aligner to securely hold the second wafer substrate. The first wafer substrate is supported by a transparent plate. The double sided mask aligner is used to align the first and second silicon wafer substrates in the alternative embodiment. Once the substrates are aligned as shown in FIG. 7, the substrates are fusion bonded as discussed previously.

Once the substrates are fusion bonded, the microstructure of the alternative embodiment is cut or sawn to have the desired depth dimension in the range of a few tenths of microns to thousands of microns, as in the preferred embodiment. By applying suitable pressure, the microstructure of the alternative embodiment is broken free from the thin silicon layer at locations adjacent to vertical walls of the microstructure so that the microstructure has the desired width dimension in the range of a few microns to thousands of microns.

Figure 8A:
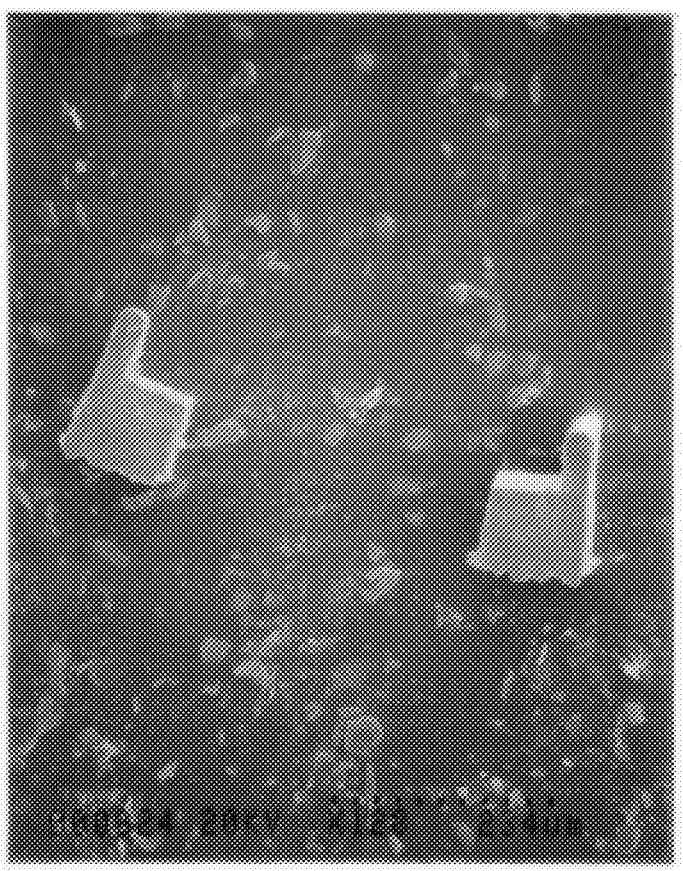
FIGS. 8A is a photo-micrograph showing side views of microstructures created in accordance with the principles of the invention.
Figure 8B:
FIGS. 8B is a photo-micrograph showing perspective views of microstructures created in accordance with the principles of the invention.

FIGS. 8A and 8B are photo-micrographs of microstructures created in accordance with the principles of the invention. As shown, the microstructures are entirely bound by substantially planar surfaces, the surfaces meeting only at substantially right angles. A respective shelf feature is disposed along a respective height dimension of each microstructure.

FIG. 8A is a side view of two microstructures. For reference purposes, a scale in the photomicrograph of FIG. 8A indicates a total scale length of approximately 234 microns. The scale in the photomicrograph of FIG. 8A includes a plurality of divisions wherein each division indicates approximately 23.4 microns.

FIG. 8B is a perspective view of a first microstructure with a portion of a second microstructure shown in the foreground. For reference purposes, a scale in the photomicrograph of FIG. 8B indicates a total scale length of approximately 120 microns. The scale in the photomicrograph of FIG. 8B includes a plurality of divisions wherein each division indicates approximately 12 microns.

Figure 9:
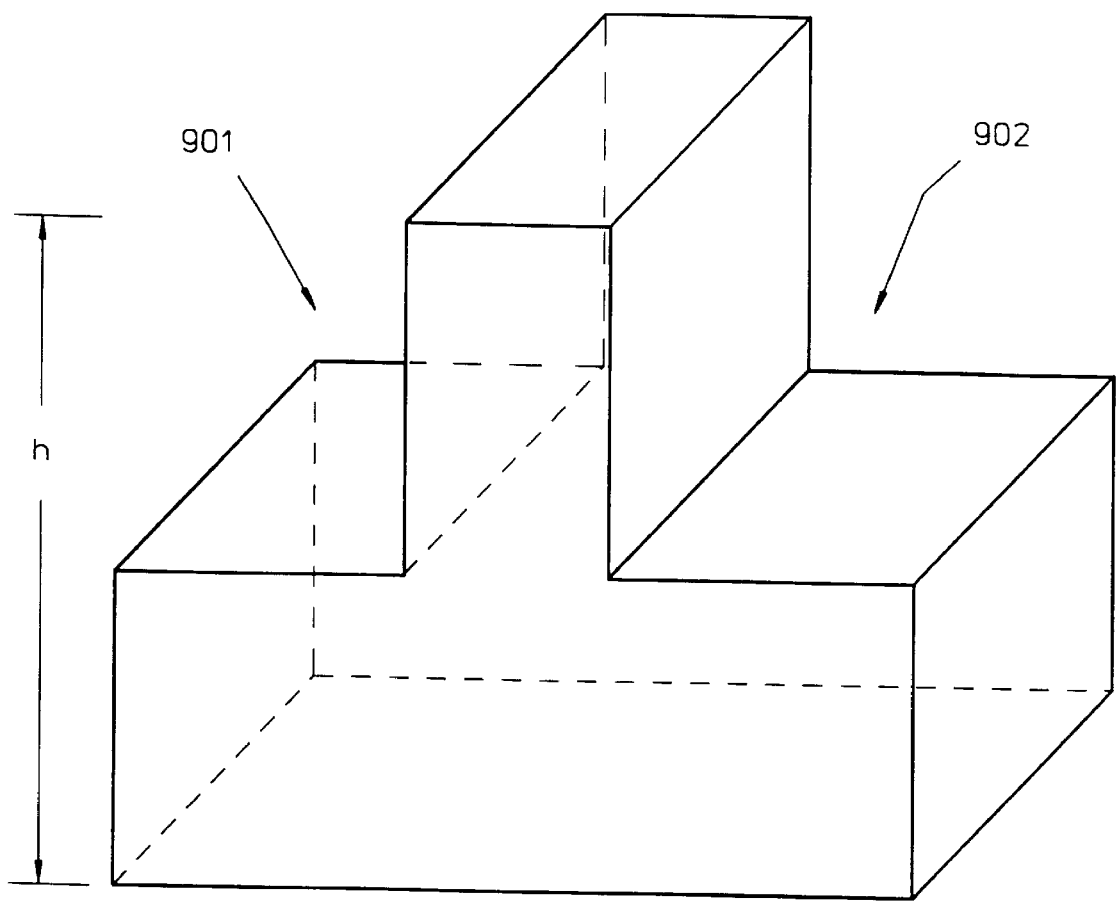
FIG. 9 is an isometric view of a first alternative microstructure
Figure 10:
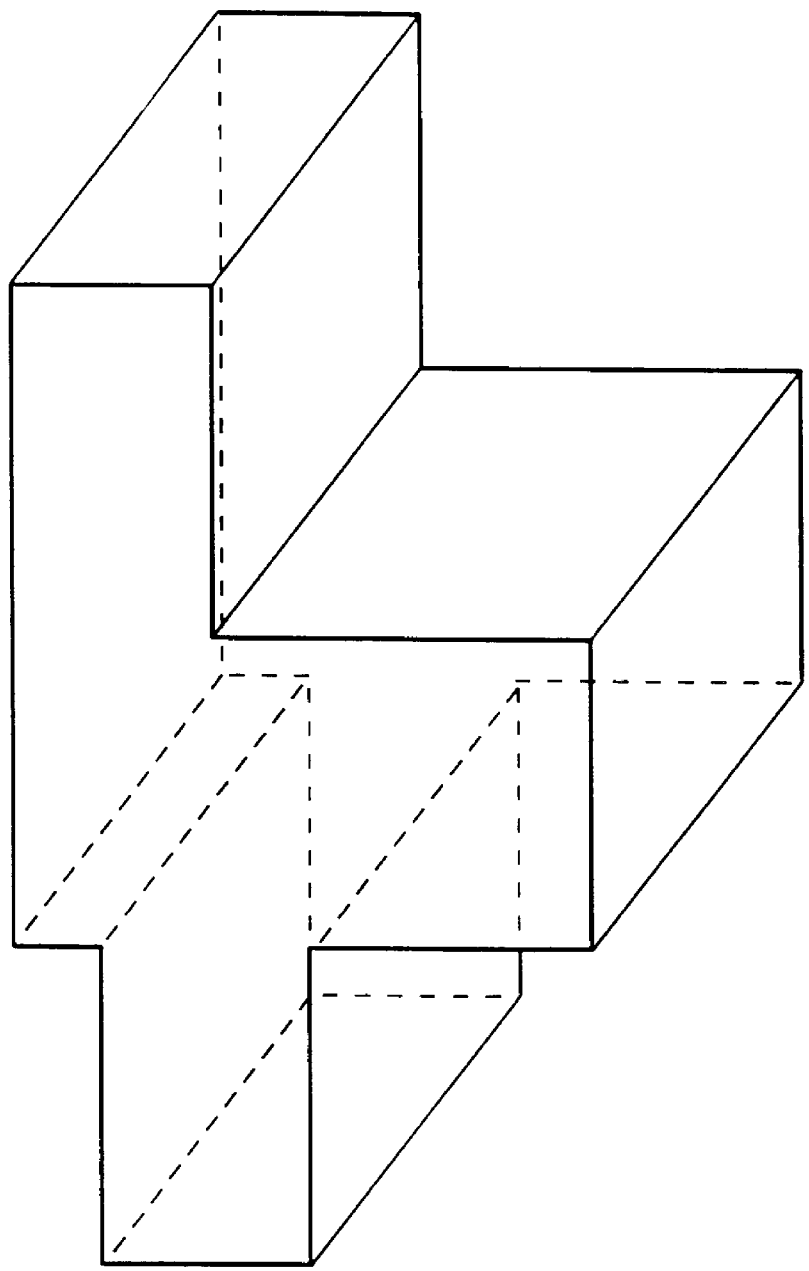
FIG. 10 is an isometric view of another alternative microstructure

It should be understood that various alternative microstructures having complex geometries can be constructed using the principles of the present invention. For example, FIG. 9 is an isometric view of a first alternative microstructure, which is constructed by suitably controlling lateral etching of recessed features in accordance with the principles of the present invention to produce opposing shelf features 901, 903 disposed along height dimension, h, of the alternative microstructure. Furthermore, it should be understood that although it is preferred to construct the microstructures of the present invention by bonding two silicon wafer substrates, more than two substrates can bonded with beneficial results. For example, FIG. 10 is an isometric view of another alternative microstructure constructed by etching respective recessed features into each of three silicon wafer substrates and bonding the three wafer substrates in accordance with the principles of the invention.

Although specific embodiments of the invention have been described and illustrated, the invention is not limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. A free standing microstructure being entirely bound by substantially planar surfaces, the surfaces meeting only at substantially right angles;

the microstructure including a substantially uniform silicon crystal lattice;

the microstructure having a height dimension; and the microstructure having a shelf feature disposed along the height dimension.

2. A free standing bulk micromachined microstructure being entirely bound by substantially planar surfaces, the surfaces meeting only at substantially right angles; the microstructure including a substantially uniform crystal lattice.

3. The microstructure as in claim 2 wherein:

the microstructure has a height dimension; and the microstructure has a shelf feature disposed along the height dimension.

4. The microstructure as in claim 2 wherein the microstructure has a height dimension in a range of a few microns to thousands of microns.

5. The microstructure as in claim 2 wherein the microstructure has a width dimension in a range of a few microns to thousands of microns.

6. The microstructure as in claim 2 wherein the microstructure has a depth dimension in a range of a few tens of microns to thousands of microns.

7. The microstructure as in claim 2 wherein the microstructure includes silicon.

* * * * *